(12) United States Patent
Neuteboom (10) Patent No.: US 9,242,721 B2
(45) Date of Patent: Jan. 26, 2016

(54) AIRCRAFT PROPULSION SYSTEM AND A METHOD OF CONTROLLING THE SAME

(75) Inventor: Martin O. Neuteboom, Derby (GB)

(73) Assignee: ROLLS-ROYCE plc, London (GB)

(*) Notice: Subject to any disclaimer, the term of this patent is extended or adjusted under 35 U.S.C. 154(b) by 1067 days.

(21) Appl. No.: 13/584,162

(22) Filed: Aug. 13, 2012

(65) Prior Publication Data
US 2013/0315701 A1 Nov. 28, 2013

(30) Foreign Application Priority Data
Aug. 22, 2011 (GB) .................................. 1114380.7

(51) Int. Cl.
B64C 11/00 (2006.01)
F01D 9/04 (2006.01)
B64C 11/48 (2006.01)
B64D 29/04 (2006.01)
B64D 27/00 (2006.01)

(52) U.S. Cl.
CPC ................. *B64C 11/00* (2013.01); *B64C 11/48* (2013.01); *B64D 29/04* (2013.01); *F01D 9/041* (2013.01); *B64D 2027/005* (2013.01); *Y02T 50/66* (2013.01)

(58) Field of Classification Search
CPC ........ B64C 11/00; B64C 11/48; B64D 29/04; B64D 2027/005; Y02T 50/66; Y02T 50/164; F01D 9/041; F01D 17/162; F05D 2240/125
USPC ..................... 415/149.2, 153.2, 199.5, 211.2; 416/128, 198 R, 198 A
See application file for complete search history.

(56) References Cited

U.S. PATENT DOCUMENTS 4,864,820 A * 9/1989 Wynosky ............... B64D 33/04
60/226.1
5,197,855 A * 3/1993 Magliozzi ............... B64C 11/00
415/119

FOREIGN PATENT DOCUMENTS

| DE | 41 21 995 A1 | 1/1992 |
| FR | 2 935 349 A1 | 3/2010 |
| GB | 2 405 184 A | 2/2005 |

OTHER PUBLICATIONS

British Search Report issued in British Application No. 1114380.7 dated Dec. 16, 2011.

* cited by examiner

*Primary Examiner* — Edward Look
*Assistant Examiner* — Danielle M Christensen
(74) *Attorney, Agent, or Firm* — Oliff PLC (57) ABSTRACT

An aircraft propulsion system has a propulsive rotor assembly rotatable about an axis of rotation and comprising a plurality of blades and a rotationally fixed vane assembly located adjacent to the propulsive rotor assembly and arranged circumferentially around the axis of rotation. As airflow enters the propulsive rotor assembly, a portion of the airflow passes over the vane assembly which is configured to direct the airflow away from the rotor blades so as to reduce the relative velocity of the redirected airflow over the rotor blades. This results in a reduced tendency of the airflow through the propulsive rotor assembly to become choked.

14 Claims, 8 Drawing Sheets

AIRCRAFT PROPULSION SYSTEM AND A METHOD OF CONTROLLING THE SAME

This invention claims the benefit of UK Patent Application No. 1114380.7, filed on 22 Aug. 2011, which is hereby incorporated herein in its entirety.

FIELD OF THE INVENTION

This invention relates to aircraft propulsion systems and particularly, but not exclusively, to aircraft propulsion systems which utilise propfan or unducted fan type engines generally characterised by two contra-rotating propellers or open rotors.

BACKGROUND TO THE INVENTION

It is known that increasing the bypass ratio of a conventional turbofan engine can reduce its fuel consumption and consequent level of $CO_2$ emissions. This characteristic has been exploited by engine manufacturers by progressively increasing the bypass ratios of modern turbofan engines.

However, there is a limit to how much the bypass ratio can be increased as eventually the weight and drag penalties associated with the size of the required engine nacelle outweigh the reduction in fuel consumption.

An alternative to the high bypass turbofan engine is the open rotor or unducted fan engine where the rotor or fan is not contained within the nacelle. This enables the fan or propeller to be larger in diameter which increases the bypass ratio while at the same time removing the need for a heavy drag-inducing nacelle.

This in turn allows the open rotor engine to burn significantly less fuel (up to 30% in some instances) and offer associated reductions in emissions when compared to a conventional turbofan engine.

An open rotor engine, although similar to a turboprop engine, is designed to operate efficiently at higher cruise velocities than turboprop engines. The primary difference between turboprop and open rotor engines is that the propeller blades on an open rotor engine have a higher solidity (generally by virtue of the greater number of propeller blades) than those of a turboprop engine. In addition, in contrast to a turboprop engine, an open rotor engine generates a portion of its total thrust from the core exhaust.

A problem with open rotor engines is that they generate higher noise levels than conventional turbofan engines, in which noise from the fan is muffled by the nacelle.

Noise is of particular concern in a preferred open rotor arrangement which comprises two contra-rotating rotor assemblies. The wakes produced by the first (upstream) rotor are 'chopped' through by the rear (downstream) rotor. The intensity of the noise emitted by the wake interaction between the front rotor and the rear rotor is proportional to the strength of the wakes produced by the front rotor blades. The strength of the wakes produced by the blades of the front rotor can be reduced by decreasing the loading, or lift, generated by each individual blade. This can be accomplished without compromising the thrust produced by the engine by increasing the number of front rotor blades, i.e. each rotor blade is required to produce less lift in order to produce the same total engine thrust.

In an open rotor engine arrangement the front rotor is subjected to axial Mach numbers equivalent to the forward flight speed of the aircraft. The high inlet velocity combined with the rotational speed of the rotor can result in the air entering the passage between two adjacent rotor blades having an even higher relative Mach number (approximately Mach 0.8). This may result in the flow regime through the open rotor suffering from choking.

In a conventional turbo-fan engine the nacelle and intake to the fan diffuses the flow such that the inlet flow Mach number is lower than the flight speed of the aircraft when in a cruise condition but is higher than the flight speed of the aircraft at take-off or landing. Consequently the problem of choking of fan blades generally does not occur in such engines.

The term choke margin is often used to describe the range of flow conditions relative to the choke point of the rotor. This can be defined as follows:

$$\text{Choke Margin} = \left( \frac{\text{Choke Flow} - \text{Operating Point Flow}}{\text{Choke Flow}} \right) \quad \text{Eqn (1)}$$

An additional constraint on the rotor blades is that they must have a minimum thickness in order to provide the required structural strength to satisfy the bird strike requirement. This required minimum thickness puts an upper limit on the size of the area (throat area) between two adjacent blades.

The high relative inlet Mach numbers and the limitation in throat area driven by the required minimum blade thickness can result in the airflow through the rotor becoming choked. Choking is particularly prevalent over the inboard portion of the blade since in this region the throat area is smallest and the blade is the thickest. Consequently, in order to avoid the flow becoming choked, it is often necessary to limit the number of blades on the rotor. However, in order to reduce the rotor noise it is desirable to increase the number of blades on the rotor.

STATEMENTS OF INVENTION

According to a first aspect of the present invention there is provided an aircraft propulsion system comprising a first propulsive rotor assembly rotatable about an axis of rotation and comprising a plurality of first rotor blades, and a first vane assembly rotationally fixed about the axis of rotation, located adjacent to the first rotor assembly and arranged circumferentially around the axis of rotation, the first vane assembly being configured to direct an airflow entering the first propulsive rotor assembly so as to reduce the velocity of the redirected airflow relative to the first rotor blades.

In an embodiment of the invention, the vane assembly is configured to turn the airflow such that it is more aligned with each of the rotor blades of the first rotor assembly. This decreases the magnitude and changes the direction of the relative velocity vector of the airflow entering the first rotor assembly.

The reduction in the relative velocity of the airflow over the blades of the first rotor assembly improves the choke margin of the rotor by reducing the relative Mach number of the airflow entering the passage between two adjacent rotor blades. This enables the blade count of the rotor to be increased which improves the overall efficiency of the system whilst also reducing the level of noise emitted.

The change in direction of the relative velocity vector also allows untwisting of the inboard portion of the rotor. In other words, the aerofoil section of the blade can be more closely aligned with the axis of rotation of the rotor assembly. This results in an increase in the throat area between two adjacent rotor blades which further improves the choke margin.

Optionally, the aircraft propulsion system further comprises a second propulsive rotor assembly comprising a plurality of second rotor blades and positioned on an opposite side of the first propulsive rotor assembly to the first vane assembly, and rotatable about the axis of rotation.

Optionally, the first propulsive rotor assembly and the second propulsive rotor assembly rotate in opposite directions to one another.

Optionally, the first vane assembly comprises a plurality of vanes and at least one of the plurality of vanes is formed as an aerofoil.

By forming the vanes as aerofoils, the oncoming airflow can be more readily redirected to change the direction and magnitude of the relative velocity vector.

In an embodiment of the invention, the span of the vanes is less than the span of the rotor blades.

In other embodiments of the invention the vanes may have a span which is substantially the same as that of the rotor blades.

In another embodiment of the invention the vanes may be twisted along their span.

Optionally, the plurality of vanes is arranged asymmetrically around the axis of rotation.

By arranging the vanes asymmetrically around the axis of rotation it is possible to mitigate engine installation effects on the rotor such as, for example, a wake propagating from an engine mounting pylon.

Optionally, each of the plurality of vanes has at least one of a span, chord, camber, circumferential lean or sweep which differs from the corresponding span, chord, camber, circumferential lean or sweep of an adjacent vane.

When an open rotor fan engine is mounted to an aircraft, the flow field around the engine assembly will generally be asymmetric as a consequence of, for example, the influence of the engine mounting pylon.

By altering the geometry of one or more of the vanes it becomes possible to asymmetrically modify the airflow entering the rotor assembly to compensate for the influence of the engine pylon. In addition to providing an improvement in choke margin, such an axisymmetric vane arrangement also provides a reduction in noise by reducing the need for the blades to pass through a cyclically varying flow field.

Optionally, one or more of the plurality of vanes comprises a winglet formed on a radially outermost portion of the one or more vanes.

The use of a winglet formed at a tip of the vane aids in decreasing the strength of tip vortices from the vane. The reduction in vane tip vortex strength reduces the noise caused by rotor interactions with the vortex. By limiting the effect of the vortex, the airflow into the rotor is smoothed which can in turn improve the choke margin and thus the aerodynamic efficiency of the rotor assembly.

Optionally, one or more of the plurality of vanes comprises a respective one or more variable pitch vanes.

The ability to vary the pitch of the vanes enables the degree to which the airflow across the rotor is modified to be varied depending on the operating conditions of the propulsion system.

The pitch of the vanes is therefore adjusted in concert with the pitch of the rotor blades in order to cope with the changes in flight speed. For example, since choking is more of a problem at cruise conditions due to the higher flight Mach number, this portion of the flight envelope may require greater pitch angle adjustment of the rotors and vanes.

Optionally, the aircraft propulsion system further comprises a vane control module operable to collectively alter a pitch of each of the one or more variable pitch vanes.

Optionally, the aircraft propulsion system further comprises a housing, wherein at least one of the plurality of vanes is movable between a first, stowed position in which the at least one vane is accommodated at least partially within the housing, and a second deployed, position in which the at least one vane protrudes from the housing and extends into the airflow entering the first propulsive rotor assembly.

By retracting the vanes when they are not required, it is possible to achieve a reduction in aerodynamic drag which makes the propulsion system more efficient.

Optionally, the aircraft propulsion system further comprises a second vane assembly rotationally fixed about the axis of rotation, arranged circumferentially around the axis of rotation, and positioned between the first and second propulsive rotor assemblies, the second vane assembly being configured to direct an airflow exiting the first propulsive rotor assembly so as to reduce the velocity of the redirected airflow relative to the surface of the second rotor blades.

A second vane assembly may be mounted on the nacelle between the front and rear rotors and arranged circumferentially around the axis of rotation. The second vane assembly receives the highly swirled flow exiting the first rotor assembly and removes a portion of this swirl such that the relative velocity (and hence relative Mach number) of the airflow entering the second rotor assembly is reduced. The second vane assembly may be implemented with or without the first vane assembly.

According to a second aspect of the present invention there is provided a method of controlling an aircraft propulsion system comprising a first propulsive rotor assembly rotatable about an axis of rotation and comprising a plurality of first rotor blades, and a plurality of vanes located adjacent to the first propulsive rotor assembly and arranged circumferentially around the axis of rotation, the plurality of vanes being configured to direct an airflow entering the first propulsive rotor assembly so as to reduce the velocity of the redirected airflow relative to the first rotor blades, the method comprising the step of:

collectively changing a pitch of the plurality of vanes.

Optionally, the aircraft propulsion system further comprises a housing, the plurality of vanes being accommodated at least partially within the housing, the method comprising the additional initial step of:

moving each of the plurality of vanes from a first, stowed position to a second, deployed position in which each vane extends from the housing into an airflow entering the first propulsive rotor assembly.

Optionally the method comprises the step of radially extending each of the plurality of vanes from a stowed position to a deployed position.

Optionally the method comprises the step of rotating each of the plurality of vanes from a stowed position to a deployed position.

According to a third aspect of the present invention there is provided a nacelle comprising an aircraft propulsion system including a first propulsive rotor assembly rotatable about an axis of rotation and a rotationally fixed first vane assembly positioned adjacent to the first propulsive rotor assembly and arranged circumferentially around the axis of rotation, wherein an axis of the nacelle is aligned with the axis of rotation.

According to a fourth aspect of the invention, there is provided method of reducing the noise emitted by an aircraft propulsion system comprising at least one propulsive rotor assembly having a plurality of rotor blades and rotatable about an axis of rotation, the method comprising the steps of installing a plurality of vanes in a circumferential arrangement around the axis of rotation to thereby reduce the velocity of an airflow over the rotor blades and to thereby reduce the rotor inlet Mach number and modifying the propulsive rotor blade assembly by adding at least one additional rotor blade to thereby reduce the noise generated by the rotor assembly when in use.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
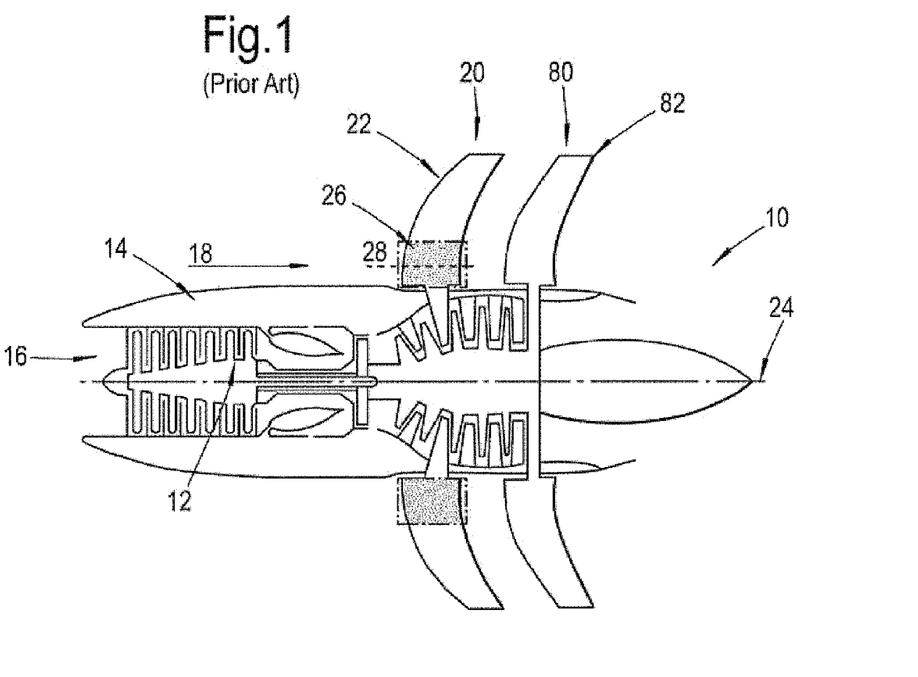
FIG. 1 is a schematic cross-sectional view of a conventional open-rotor turbofan aircraft engine.

Referring to FIG. 1, a conventional open-rotor turbofan engine assembly is designated generally by the reference numeral 10.

The open rotor engine assembly 10 comprises an engine core 12, a nacelle 14 which separates the core airflow 16 from an external airflow 18, a first rotor assembly 20 comprising a plurality of first rotor blades 22, and a second rotor assembly 80 comprising a plurality of second rotor blades 82.

Both the first and second rotor assemblies 20, 80 rotate about an axis of rotation 24.

For a given flight condition, the velocity of the external airflow 18 is sufficient to cause a choked region 26 to form over a portion of the span of the first rotor 20, as indicated in FIG. 1.

Figure 2:
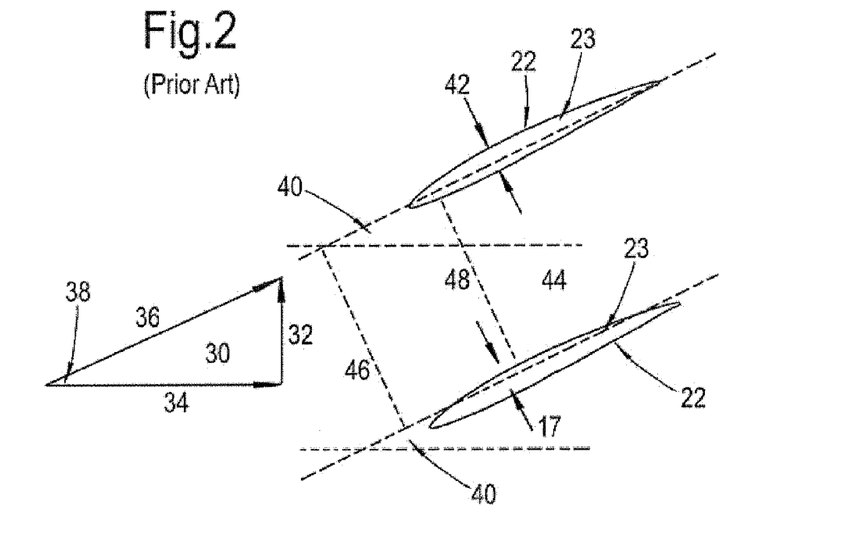
FIG. 2 is a diagrammatic representation of the airflow over the open-rotor blades of the prior art engine of FIG. 1.

FIG. 2 shows, in diagrammatic form, the airflow 18 entering the first rotor assembly 20 of the engine assembly 10. A velocity triangle 30 represents the vector components of the airflow 18 at a given rotor radius 28.

A rotational velocity vector 32, which represents the circumferential rotor velocity, is added to the axial velocity vector 34, representing the axial flight speed of the aircraft, to create a relative velocity vector 36 which is oriented at an angle 38 to the axial velocity vector 34.

The relative velocity vector 36 is greater in magnitude than the axial velocity vector 34. This means that the velocity of the airflow in the plane of the rotor blade section is greater than the velocity of the airflow along the axis of the rotor.

The airflow velocity can be converted to Mach number by the well known relationship:

$$M = \frac{v}{\sqrt{\gamma RT}} \qquad \text{Eqn (2)}$$

where: M=Mach number;
v=airflow velocity;
γ=specific heat ratio;
R=universal gas constant; and
T=absolute temperature.

Each of the first rotor blades 22 has an aerofoil-shaped cross sectional profile 23 having a maximum thickness 42, and being substantially aligned with the relative velocity vector 36. The angle of alignment of the first rotor blade sections 23 is termed the stagger angle 40.

The maximum thickness 42 is determined largely by a structural requirement for the rotor blade 22 to be capable of withstanding a bird strike while in flight without comprising the operational integrity of the engine assembly 10.

The relative spacing of the first rotor blades 22 creates a passage 44 between adjacent front rotor blades 22, having an inlet area 46 which narrows to a smaller minimum area defined as a throat area 48. The choice of aerofoil profile shape in combination with the thickness 42 and the stagger 40 dictates the size of the throat area 48.

The ratio of the inlet area 46 to the throat area 48 for the choking condition to occur at a given Mach number is governed by the known compressible flow relationship:

$$\frac{A}{A^*} = \frac{1}{M}\left\{\frac{2}{(\gamma+1)}\left(1+\left(\frac{\gamma-1}{2}\right)M^2\right)\right\} \qquad \text{Eqn (3)}$$

where: A=inlet area;
A*=throat area at which choking will occur;
M=relative Mach number at the inlet 46 to the rotor; and
γ=specific heat ratio.

If the ratio of the inlet area 46 to the throat area 48 for the first rotor 20 is greater than A/A* for the relative inlet Mach number at a flight condition, i.e.

$$\left(\frac{\text{Inlet Area}}{\text{Throat Area}}\right) > \frac{A}{A^*},$$

choking will occur. This will result in a loss in efficiency, an increase in drag, and limit to the thrust which the engine can provide. Thus choking is governed by the relative Mach number and the area ratio, $$\left(\frac{\text{Inlet Area}}{\text{Throat Area}}\right).$$

Figure 3:
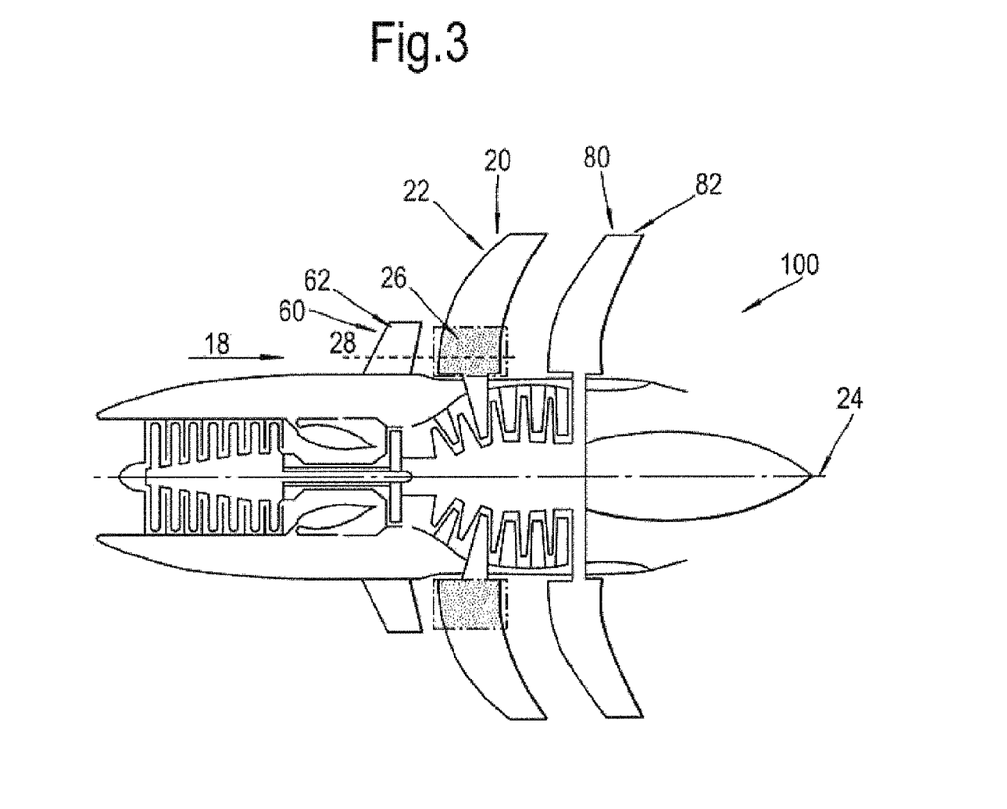
FIG. 3 is a schematic cross-sectional view of an open-rotor turbofan aircraft engine according to a first embodiment of the invention.

Referring to FIG. 3, an open rotor engine assembly according to an embodiment of the invention is designated generally by the reference numeral 100. Features of the engine assembly 100 which correspond to those of engine assembly 10 have been given corresponding reference numerals for ease of reference.

The engine assembly 100 includes all the features of engine assembly 10 with the addition of a first vane assembly 60 comprising a plurality of first vanes 62. The first vane assembly 60 is mounted on the nacelle 14 and is circumferentially arranged around the axis of rotation 24.

Figure 4A:
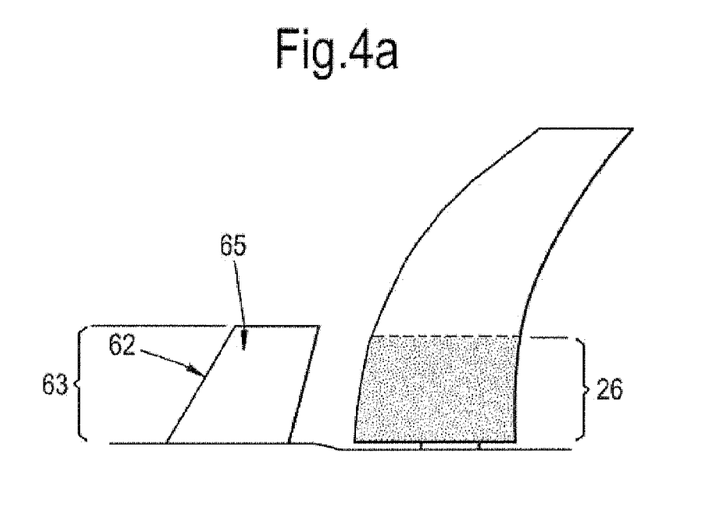
FIG. 4a is a partial side view of the engine of FIG. 3 showing a vane and a rotor blade.

As shown in FIG. 4a, the first vanes 62 have a span 63 which extends slightly beyond the region 26 for which choking or choke margin is a concern. The cross sectional profile 64 of a first vane 62 can be suitably designed by using velocity diagrams (see FIG. 5) to achieve a desirable combination of rotor blade inlet Mach number and area ratio at any given point in the span 63.

Figure 4B:
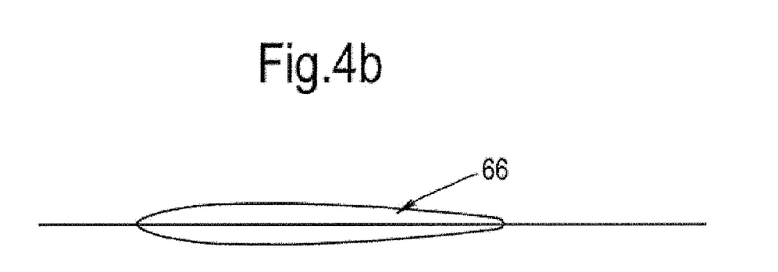
FIG. 4b is a plan view of a vane of the embodiment of FIG. 3.

The tip cross section 66 (see FIG. 4b) of a first vane 62 which extends beyond the choked region 26 of the first rotor 20 can be designed with zero camber in order to produce very little or no lift at the tip of the vane. Designing the tip region 65 of the airfoil to carry zero lift will limit the effect of tip vortices known to occur at the free end of wings. Other known methods of diminishing the strength of tip vortices that may be generated by the first vanes 62 can be employed, such as winglets or elliptical planform shaping.

Figure 5:
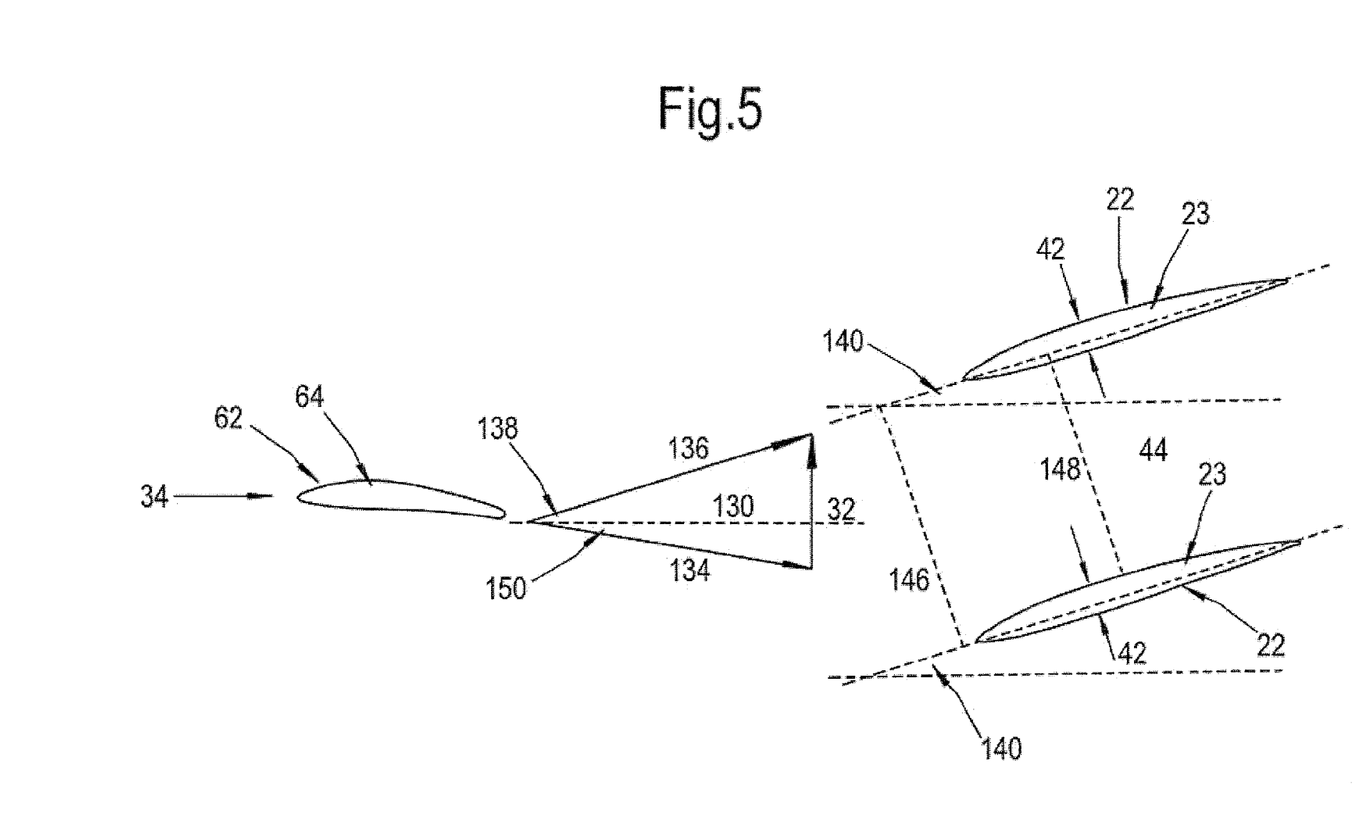
FIG. 5 is a diagrammatic representation of the airflow over the open-rotor blades of the engine of FIG. 3.

FIG. 5 shows in diagrammatic form the airflow 18 through the first vanes 62 and first rotor assembly 20 of the engine assembly 100. A velocity triangle 130 represents in vector form the components of the airflow 18 at the rotor radius 28.

The free stream airflow 18, represented by axial velocity vector 34, entering the first vane assembly 60 is turned through a small angle 150 by the first vane 62. As shown in FIG. 5, the first vane 62 has an aerofoil-shaped cross-sectional profile 64.

Having passed over the vane section 64 the airflow has a vane exit velocity vector 134. The rotational velocity vector 32 of the first rotor 20 combines with the vane exit velocity vector 134 to create a new relative inlet velocity vector 136 which is oriented at an angle 138 to the axial velocity vector 34.

The new relative inlet velocity vector 136 is smaller in magnitude than the corresponding relative inlet velocity vector 36 for the engine 10 (i.e. without the first vane assembly 60). In addition, the relative inlet velocity vector 136 is more axially aligned with the axis of rotation 24 than is the corresponding relative inlet velocity vector 36 (i.e. angle 138 is smaller than angle 38).

The rotor sections 23 of engine 100 are substantially aligned with the new relative inlet velocity vector 136 to create a new stagger angle 140.

This new stagger angle 140 is smaller than the corresponding stagger angle 40 in engine 10 which results in the passage 44 having a new inlet area 146 and throat area 148.

Since, as described above, the blade sections 23 of engine 100 are more axially aligned than the corresponding blade sections 23 of engine 10, the throat area 148 can be larger than the throat angle 48 of engine 10. This lowers the airflow velocity through the passage 44 which has the effect of decreasing the relative Mach number of the airflow.

This decrease in relative Mach number together with the increase in throat area 148 results in an improvement in the choke margin.

It is to be noted that the current invention can provide a performance benefit to the engine, for example by decreasing the ratio of $$\left(\frac{A}{A^*}\right) \text{ or } \left(\frac{\text{Inlet Area}}{\text{Throat Area}}\right)$$

without eliminating choking in the blade passages. In this situation the value of the choke margin according to Equation (1) will be zero, i.e. the same as if the vanes were not present and the flow was choked. However the vanes will still decrease the Mach number relative to the blade passage which in turn will decrease the strength of the shock which forms at the passage throat. A weaker shock will produce less aerodynamic loss and the system performance will therefore be improved.

In an alternative embodiment of the invention (see FIGS. 6a, 6b and 6c), the individual first vanes 62 that are arranged circumferentially on the nacelle 14 could each have different geometries to one another in order to accommodate an asymmetric flow field around the engine nacelle 14.

This asymmetric flow field arises from the airflow passing over the aircraft structure 160 not being symmetrically disposed relative to the engine axis 24. One major effect on the flow 18 experienced by an open rotor engine 10 is that caused by the engine mounting pylon 162 which creates a strong wake near the inlet plane of the front rotor assembly 20.

Figure 7:
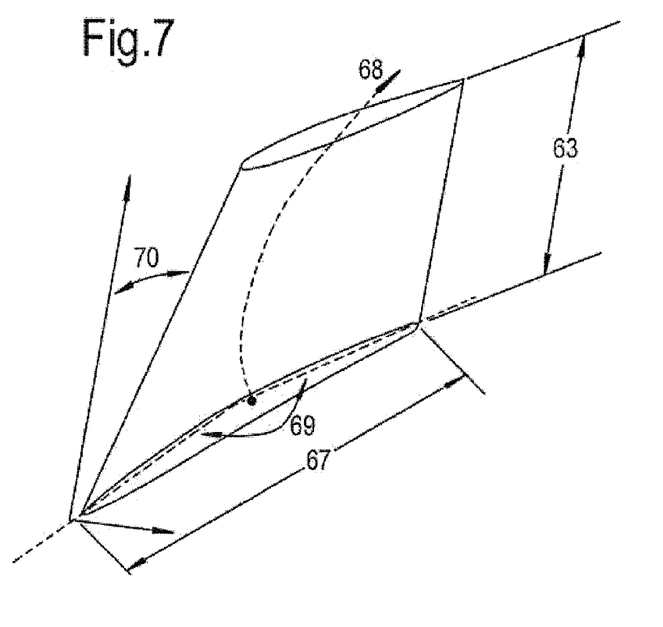
FIG. 7 is a perspective schematic view of a vane of the embodiment of FIG. 3.

The velocity field in the airflow around the engine can be analysed, accounting for these installation effects, using modern computational methods which are known in the art. Based on such an analysis the span 63, chord 67, stack 68, camber 69 and sweep 70 (see FIG. 7) of individual first vanes 62 can be suitably chosen by one skilled in the art.

Figure 6A:
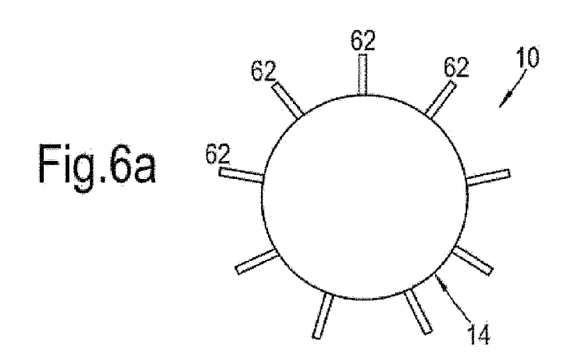
FIGS. 6a and 6b are schematic elevational views of an engine nacelle showing symmetric and asymmetric arrangements respectively of a vane assembly according to the embodiment of FIG. 3.

FIG. 6a shows a schematic elevational view of an engine nacelle 14 showing an axisymmetric distribution of vanes 62, each having a common geometry.

Figure 6B:
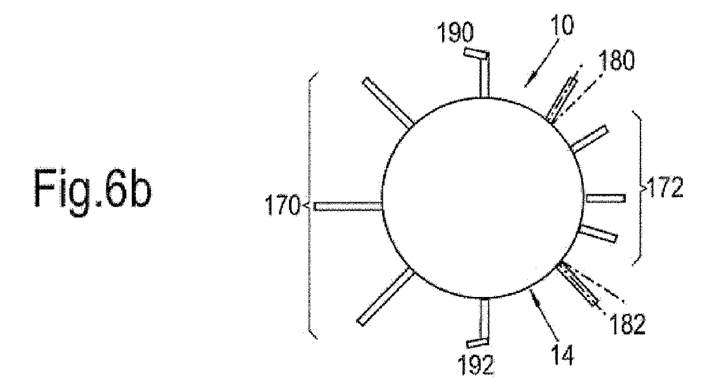
Figure 6C:
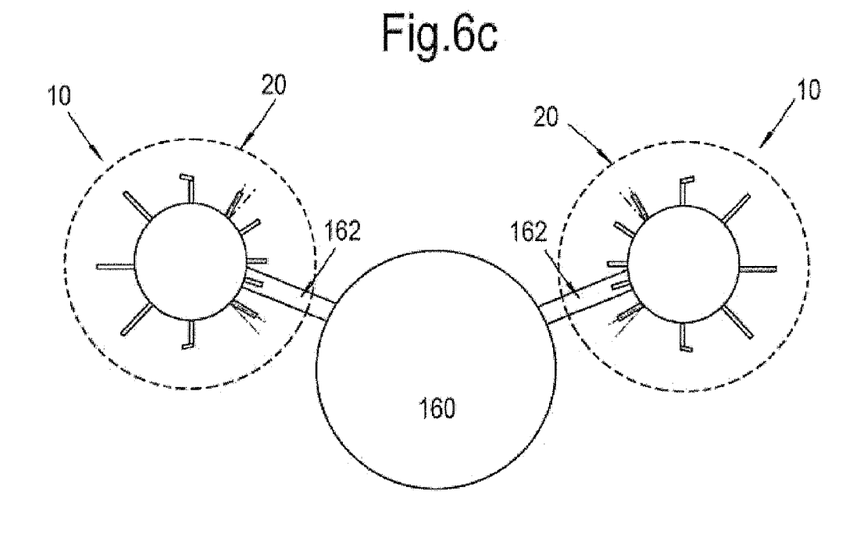
FIG. 6c is a schematic elevational view of an aircraft having pylon mounted nacelles with asymmetric arrangements of vane assemblies according to the embodiment of FIG. 3.

FIG. 6b shows a similar view to that of FIG. 6a but with a non-axisymmetric distribution of vanes 62 and also showing vanes 62 having a variety of geometries. This variation in geometry might include, for example, vanes having greater span 170, lesser span 172, varying stack (shown as circumferential lean 180,182), and the addition of winglets 190,192.

FIG. 6c shows a schematic cross-sectional view of an aircraft 160 having two open rotor engines 100 mounted to respective pylons 162. The engines 100 incorporate a non-axisymmetric arrangement of first vanes 62 such as that shown in FIG. 6b which are upstream of the first rotor assembly 20. FIG. 6c is representative of both pusher-type and puller-type open-rotor arrangements.

In a further embodiment (FIGS. 10a, 10b and 11) each of the first vanes 62 may be deployable. That is to say the vanes 62 can be retracted into the nacelle for those portions of the flight envelope for which they do not provide an aerodynamic benefit to the first rotor 20, for example during low speed flight operation. The vanes 62 may then be extended for the portions of the flight envelope for which they are beneficial, such as, for example, flying at cruising altitude.

Figure 9:
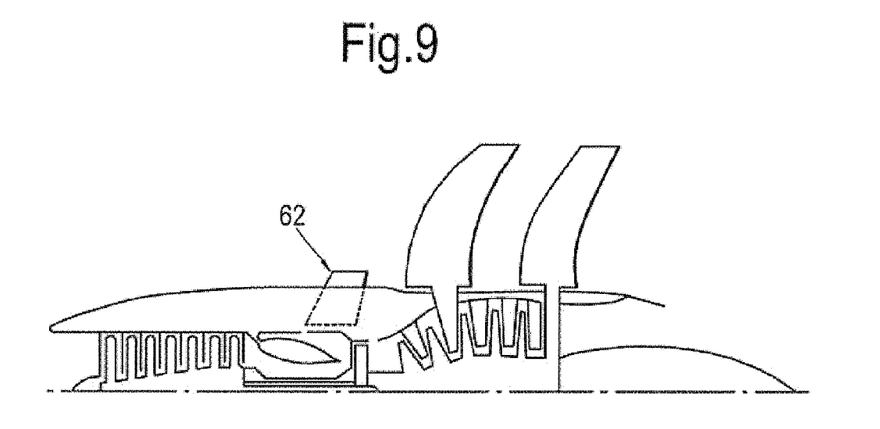
FIG. 9 is a schematic, partial, cross-sectional view of the engine of FIG. 8 having a radially deployable vane assembly and showing one vane in a partially radially retracted position.

In one arrangement, the first vanes 62 may be extended radially from a retracted position in which they are accommodated either entirely, or substantially entirely, within the outer surface of the nacelle 14. Any suitable actuating mechanism (not shown) could be used to extend and retract the vanes 62 such as, for example, hydraulic cylinders or electric motors.

In an alternative arrangement (shown in FIGS. 10a and 10b), the first vanes 62 may be hinged at a pivot 350 which is connected to the nacelle structure 351. The vanes 62 may be retracted by pivoting the vanes 62 in a circumferential direction by means of an actuator 352. In this arrangement, when the vane is in its retracted position, one of the vane surfaces 355 remains flush with the outer surface 353 of the nacelle 14.

In such an embodiment, the first vanes 62 may be attached to a nacelle filler 354 that is arranged to extend approximately perpendicularly to the vane 62 near the pivot axis 350. As a result, when the vanes 62 are extended as shown in FIG. 10b, the nacelle filler 354 will rotate to be flush with the nacelle surface 353 and will fill the void left by the extended vane 62. Other means such as, for example, a sliding panel might also be used to fill this void space.

Figure 10A:
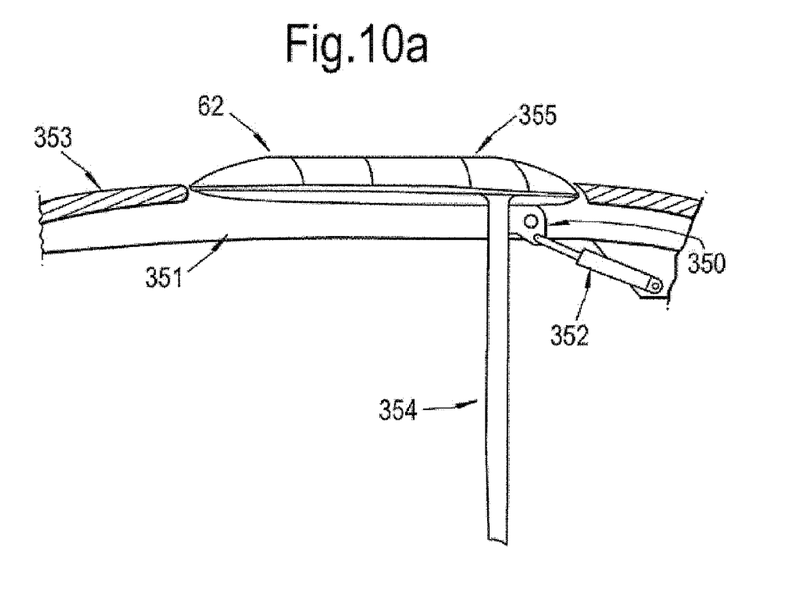
FIG. 10a is a schematic elevational view of a portion of an engine nacelle in which the vane assembly is rotatably retractable and showing a vane in the retracted position.
Figure 10B:
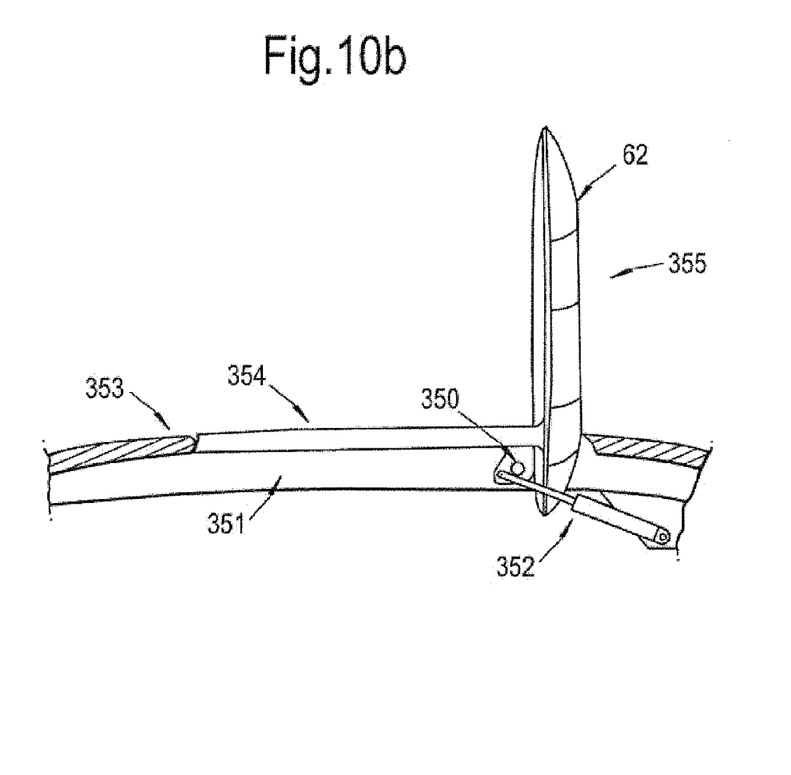
FIG. 10b shows the vane assembly of FIG. 10a in an extended position.
Figure 11:
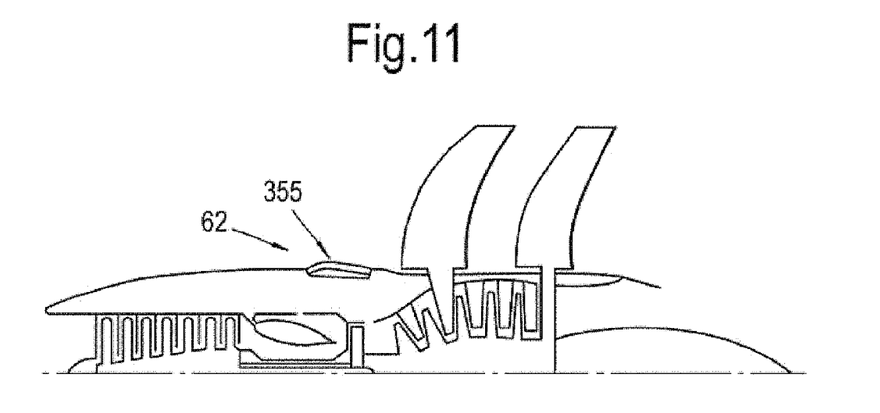
FIG. 11 is a schematic, partial, cross-sectional view of the engine of FIG. 8 having a rotatably retractable vane assembly and showing nacelle shaping by a retracted vane.

In a variation of this embodiment exemplified by FIGS. 10a and 11, a surface 355 of the rotatably deployable first vanes 62 protrudes above the outer surface 353 of the nacelle 14 when the vanes are in their retracted position. In this arrangement, the surface 355 of the vane 62 which is exposed to the inlet flow 18 is suitably shaped to provide an aerodynamic benefit (i.e. nacelle shaping) to the flow 18 entering the first rotor 20.

In yet another embodiment (not shown), the first vanes 62 can be arranged to have variable pitch. Variable pitch enables the vanes 62 to modify the inlet airflow 18 such that the resulting inlet flow velocity vector 136 is optimised for a range of operating conditions of the aircraft, such as, for example, take-off, climb and cruise. This variation in the pitch of the vanes 62 may or may not be linked to changes in the pitch angle of the rotor blades 22.

Figure 8:
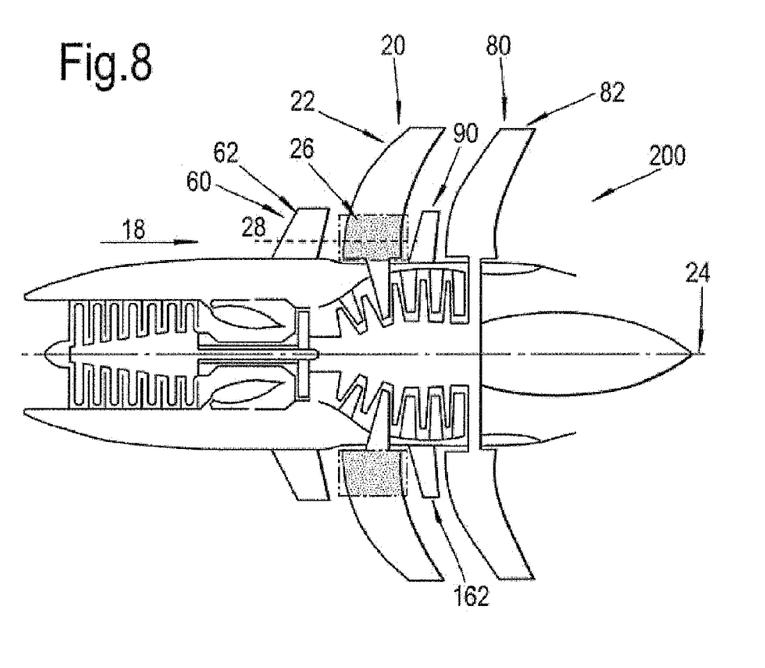
FIG. 8 is a schematic cross-sectional view of an open-rotor turbofan aircraft engine according to a second embodiment of the invention.

Referring to FIG. 8, an open rotor engine assembly according to a second embodiment of the invention is designated generally by the reference numeral 200. Features of the engine assembly 200 which correspond to those of engine assembly 100 have been given corresponding reference numerals for ease of reference.

The engine assembly 200 includes all the features of engine assembly 100 with the addition of a second vane assembly 90 comprising a plurality of second vanes 162. The second vane assembly 90 is mounted on the nacelle 14 between the first and second rotor assemblies 20,80 and is circumferentially arranged around the axis of rotation 24.

The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

What is claimed is:

1. An aircraft propulsion system comprising:
    a first propulsive rotor assembly rotatable about an axis of rotation and comprising a plurality of first rotor blades; and
    a first vane assembly rotationally fixed about the axis of rotation, located adjacent to the first propulsive rotor assembly and arranged circumferentially around the axis of rotation;
    the first vane assembly being configured to direct an airflow entering the first propulsive rotor assembly so as to reduce the velocity of the redirected airflow relative to the first rotor blades, and
    wherein the first vane assembly comprises a plurality of vanes and at least one of the plurality of vanes is formed as an aerofoil.

2. The aircraft propulsion system as claimed in claim 1, further comprising a second propulsive rotor assembly comprising a plurality of second rotor blades and positioned on an opposite side of the first propulsive rotor assembly to the first vane assembly, and rotatable about the axis of rotation.

3. The aircraft propulsion system as claimed in claim 2 wherein the first propulsive rotor assembly and the second propulsive rotor assembly rotate in opposite directions to one another.

4. The aircraft propulsion system as claimed in claim 2 further comprising:
    a second vane assembly rotationally fixed about the axis of rotation, arranged circumferentially around the axis of rotation, and positioned between the first and second propulsive rotor assemblies;
    the second vane assembly being configured to direct an airflow exiting the first propulsive rotor assembly so as to reduce the velocity of the redirected airflow relative to the second rotor blades.

5. The aircraft propulsion system as claimed in claim 1 wherein the plurality of vanes is arranged asymmetrically around the axis of rotation.

6. The aircraft propulsion system as claimed in claim 1 wherein each of the plurality of vanes has at least one of a span, chord, camber, circumferential lean or sweep which differs from the corresponding span, chord, camber, circumferential lean or sweep of an adjacent vane.

7. The aircraft propulsion system as claimed in claim 1 wherein one or more of the plurality of vanes comprises a winglet formed on a radially outermost portion thereof.

8. The aircraft propulsion system as claimed in claim 1 wherein one or more of the plurality of vanes comprises a respective one or more variable pitch vanes.

9. The aircraft propulsion system as claimed in claim 1 further comprising a housing,
    wherein at least one of the plurality of vanes is movable between
        a first, stowed position in which the at least one vane is accommodated at least partially within the housing, and
        a second, deployed position in which the at least one vane protrudes from the housing and extends into the airflow entering the first rotor assembly.

10. A nacelle comprising an aircraft propulsion system as claimed in claim 1, wherein an axis of the nacelle is aligned with the axis of rotation.

11. A method of controlling an aircraft propulsion system comprising a first propulsive rotor assembly rotatable about an axis of rotation and comprising a plurality of first rotor blades and a plurality of vanes located adjacent to the first propulsive rotor assembly and arranged circumferentially around the axis of rotation, and the aircraft propulsion system further comprising a housing, the plurality of vanes being accommodated at least partially within the housing, the method comprising the steps of:

moving each of the plurality of vanes from a first, stowed position to a second, deployed position in which each vane extends from the housing into an airflow entering the first rotor assembly; and collectively changing a pitch of the plurality of vanes so as to direct an airflow entering the first propulsive rotor assembly so as to reduce the velocity of the redirected airflow relative to the first rotor blades.

12. The method as claimed in claim 11, wherein the step of moving each of the plurality of vanes from a first, stowed position to a second, deployed position in which each vane extends from the housing into an airflow entering the first propulsive rotor assembly comprises the step of:

radially extending each of the plurality of vanes from a first, stowed position to a second, deployed position in which each vane extends from the housing into an airflow entering the first propulsive rotor assembly.

13. The method as claimed in claim 11, wherein the step of moving each of the plurality of vanes from a first, stowed position to a second, deployed position in which each vane extends from the housing into an airflow entering the first propulsive rotor assembly comprises the step of:

rotating each of the plurality of vanes from a first, stowed position to a second, deployed position in which each vane extends from the housing into an airflow entering the first propulsive rotor assembly.

14. A method of reducing the noise generated by an aircraft propulsion system comprising at least one propulsive rotor assembly having a plurality of rotor blades and rotatable about an axis of rotation, the method comprising the steps of:

installing a plurality of vanes in a circumferential arrangement around the axis of rotation to direct an airflow entering the first propulsive rotor assembly so as to reduce the velocity of the redirected airflow relative to the rotor blades; and modifying the propulsive rotor blade assembly by adding at least one additional rotor blade to thereby reduce the noise generated by the propulsive rotor assembly when in use.

* * * * *